United States Patent
Yoo

(10) Patent No.: US 9,008,731 B2
(45) Date of Patent: Apr. 14, 2015

(54) MOBILE TERMINAL

(75) Inventor: Joonhee Yoo, Incheon (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 13/208,600

(22) Filed: Aug. 12, 2011

(65) Prior Publication Data

US 2012/0071207 A1    Mar. 22, 2012

(30) Foreign Application Priority Data

Sep. 20, 2010   (KR) .................. 10-2010-0092677

(51) Int. Cl.
| | |
|---|---|
| H04B 1/38 | (2006.01) |
| H04M 1/02 | (2006.01) |
| G06F 1/16 | (2006.01) |

(52) U.S. Cl.
CPC ........... *H04M 1/0266* (2013.01); *G06F 1/1626* (2013.01); *G06F 1/165* (2013.01); *G06F 1/1654* (2013.01); *H04M 2250/16* (2013.01)

(58) Field of Classification Search
CPC ..... G06F 1/1626; G06F 1/165; G06F 1/1654; H04M 1/0266; H04M 2250/16
See application file for complete search history.

(56) References Cited

U.S. PATENT DOCUMENTS

| | | | |
|---|---|---|---|
| 2003/0125081 A1* | 7/2003 | Boesen .................... | 455/556 |
| 2003/0169212 A1 | 9/2003 | Nishihara | |
| 2004/0263505 A1* | 12/2004 | Tsubokura et al. ........... | 345/204 |
| 2006/0234785 A1 | 10/2006 | Lee et al. | |
| 2007/0135188 A1* | 6/2007 | Watanabe et al. .......... | 455/575.3 |
| 2007/0181456 A1* | 8/2007 | Kusuda et al. ................ | 206/443 |
| 2009/0244853 A1* | 10/2009 | Takahashi ................ | 361/724 |
| 2010/0222110 A1 | 9/2010 | Kim et al. .................... | 455/566 |

FOREIGN PATENT DOCUMENTS

| | | |
|---|---|---|
| CN | 1902571 | 1/2007 |
| CN | 101827503 | 9/2010 |
| EP | 1 698 965 A1 | 9/2006 |
| WO | WO 2005/020046 | 3/2005 |
| WO | WO 2009/156490 | 12/2009 |

OTHER PUBLICATIONS

European Search Report issued in EP Application No. 11006819 dated Feb. 1, 2012.
Chinese Office Action issued in related Application No. 201110277560.8, dated Sep. 4, 2013.

* cited by examiner

*Primary Examiner* — Fayyaz Alam
*Assistant Examiner* — Mohammed Rachedine
(74) *Attorney, Agent, or Firm* — Ked & Associates, LLP

(57) ABSTRACT

A mobile terminal as broadly described herein may include a first body, and a second body formed of a transparent material and attached to the first body. The second body may include a recess formed on a surface of the second body and recessed away from the first body, a transparent display provided in the recess and formed of a transparent material, and configured to display visual information thereon, and a filler material provided in the recess at a gap between the transparent display and the recess. The filler material may be formed of a transparent material.

19 Claims, 13 Drawing Sheets

MOBILE TERMINAL

CROSS-REFERENCE TO RELATED APPLICATION(S)

This application claims priority under 35 U.S.C. §119 to Korean Application No. 10-2010-0092677 filed in Korea on Sep. 20, 2010, whose entire disclosure is hereby incorporated by reference.

BACKGROUND

1. Field

A mobile terminal having a transparent case is disclosed herein.

2. Background

Terminals can be classified into two types including a mobile terminal and a stationary terminal. Furthermore, the mobile terminal can be further classified into two types including a handheld terminal and a vehicle mounted terminal.

Over time, these terminals have become multifunctional, such that they have the ability to capture still images or moving images, play music or video files, play games, receive broadcast and the like. These terminals are often referred to as multimedia players.

In order to implement the complex function of a multimedia player, various improvements have been made in the aspects of hardware and software implementation. As an example, a user interface environment is provided for the user to easily or conveniently retrieve or select a function.

Furthermore, because a mobile terminal may be considered a personal belonging which may express one's own personality, various forms of design may be provided. The designs may include aesthetic designs as well as structural changes and improvements for the user to more conveniently use the mobile terminal.

A transparent case and a display (especially, a transparent display) output thereon, as disclosed and embodied herein below, provides such structural changes and improvements.

BRIEF DESCRIPTION OF THE DRAWINGS

The embodiments will be described in detail with reference to the following drawings in which like reference numerals refer to like elements wherein.

DETAILED DESCRIPTION

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigational device, and the like.

Figure 1:
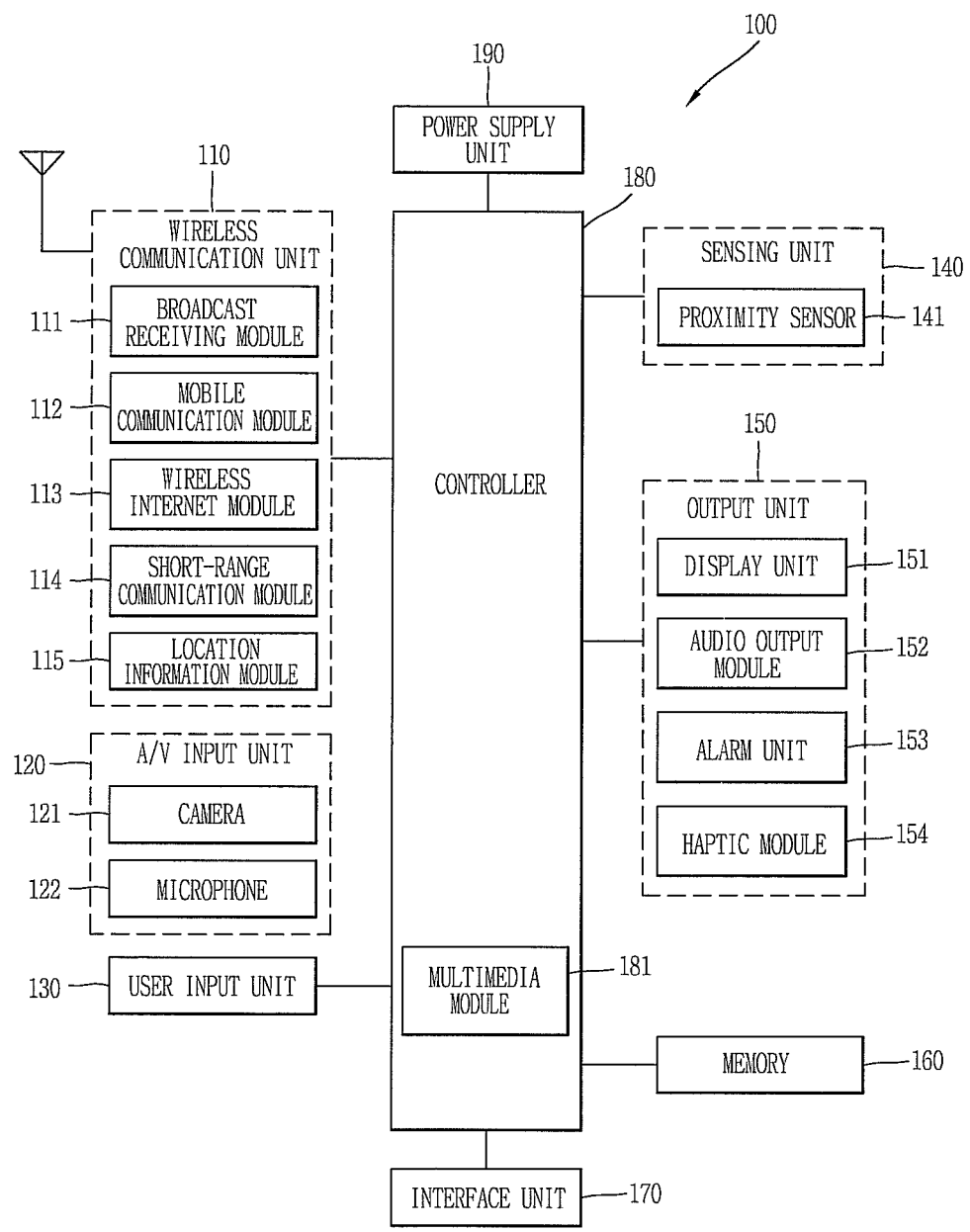
FIG. 1 is a block diagram illustrating a mobile terminal associated with an exemplary embodiment.

FIG. 1 is a block diagram illustrating a mobile terminal associated with an exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 may include one or more elements that allows radio communication between the mobile terminal 100 and a wireless communication system, or radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 may receive broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and/or a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The mobile communication module 112 may transmit and/or receive a radio signal to and/or from at least one of a base station, an external terminal, a server or another appropriate type of device over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting short-range communication. In this exemplary embodiment, it may be implemented using a short-range communication technology including Bluetooth, Radio Frequency IDentification (RFID), Infrared Data Association (IrDA), Ultra WideBand (UWB), ZigBee, or the like.

The location information module 115 is a module for checking or acquiring a location of the mobile terminal, such as a GPS module.

Referring to FIG. 1, the A/V input unit 120 may receive an audio or video signal, and the A/V input unit 120 may include a camera 121 and a microphone 122. The camera 121 may process an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 may receive an external audio signal through a microphone in a phone call mode, a recording mode, a voice recognition mode, or the like, and may process the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured to include a keypad, a dome switch, a touch pad (pressure/capacitance), a jog wheel, a jog switch, or the like.

The sensing unit 140 may detect a current status of the mobile terminal 100 such as an opened or closed state of the mobile terminal 100, a location of the mobile terminal 100, existence or non-existence of a user contact, an orientation of the mobile terminal 100 or the like, and may generate a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. Moreover, the sensing unit 140 may include a proximity sensor 141.

The output unit 150 is configured to provide an output for an audio signal, video signal, or alarm signal, and the output unit 150 may include the display unit 151, an audio output module 152, an alarm unit 153, a haptic module 154, or the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display or another appropriate type of display device.

Some of those displays may be configured with a transparent or optical transparent type to allow viewing of the exterior through the display unit, and such displays may be called transparent displays. An example of a typical transparent display may include a transparent LCD (TOLED), or the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on a surface to be spaced apart from or integrated with each other, or may be arranged on different surfaces.

In embodiments where the display unit 151 and a touch sensitive sensor (referred to as a touch sensor) have an inter-layer structure, the structure may be referred to as a touch screen. The display unit 151 may be used as an input device in addition to being used as an output device. The touch sensor may be implemented as a touch film, a touch sheet, a touch pad, or the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller. The touch controller may process the received signals, and then may transmit corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, or another appropriate type of sensor. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position corresponds to a position where the pointer faces perpendicular to the touch screen upon the proximity touch of the pointer.

The proximity sensor senses proximity touch, and/or proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, or the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 may output signals notifying occurrence of events from the mobile terminal 100. The events occurring from the mobile terminal 100 may include a call received, a message received, a key signal input, a touch input, or the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 may generate various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, or the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, or the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, or the like.

The identification module may be configured as a chip for storing various information required to authenticate an authority to use the mobile terminal 100, which may include a User Identity Module (UIM), a Subscriber Identity Module (SIM), or the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing whether the mobile terminal 100 has been correctly mounted to the cradle.

The controller 180 may control the overall operations of the mobile terminal 100. For example, the controller 180 may perform the control and processing associated with telephony calls, data communications, video calls, or the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
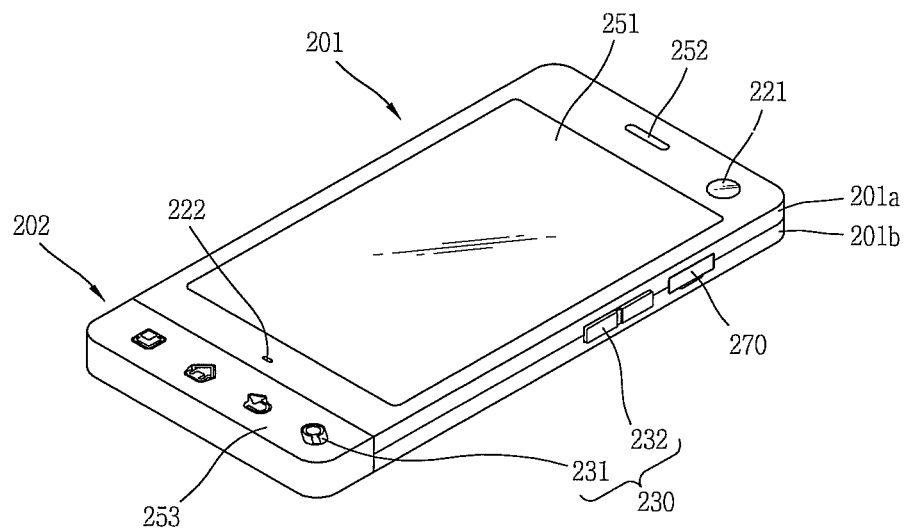
FIG. 2A is a front perspective view illustrating an example of a mobile terminal.
Figure 2B:
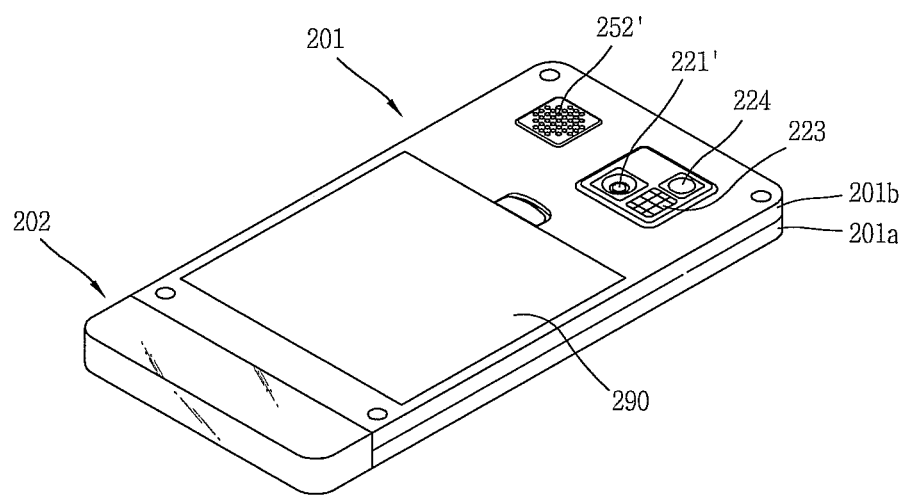
FIG. 2B is a rear perspective of the mobile terminal of FIG. 2A.
Figure 2C:
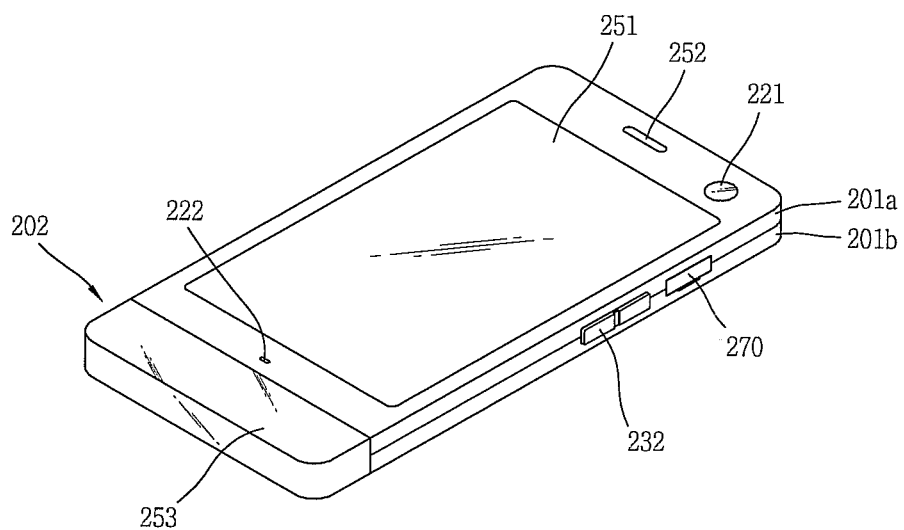
FIG. 2C is a perspective view illustrating a deactivated state of a transparent display module on a second body of FIG. 2A.

FIG. 2A is a front perspective view illustrating an example of a mobile terminal, FIG. 2B is a rear perspective of the mobile terminal of FIG. 2A, and FIG. 2C is a perspective view illustrating a deactivated state of a transparent display module on a second body of FIG. 2A.

The mobile terminal 200 as disclosed herein is provided with a bar-type terminal body. However, the present application is not limited to this type of terminal, but is also applicable to various structures of terminals such as slide type, folder type (flip type), swivel type, swing type, a combination of a swivel and flip type, or the like, in which two and more bodies may be combined with each other in a relatively movable manner.

As shown in the drawings, the bar type terminal body may include a first and second bodies 201 and 202. The first body 201 defines a substantial portion of the shape of the bar type terminal body, and the second body 202 may be mounted to the first body 201 to form a partial appearance of the terminal body.

The first body includes a case (casing, housing, cover, etc.). In this exemplary embodiment, the case may be divided into a front case 201a and a rear case 201b. Various electronic components may be mounted in a space formed between the front case 201a and the rear case 201b. At least one intermediate case may be additionally disposed between the front case 201a and the rear case 201b. The cases may be formed by injection-molding a synthetic resin or may be also formed of a metal material such as stainless steel (STS), titanium (Ti), or the like.

A display module 251, an audio output unit 252 (speaker), a camera 221, a user input unit 230/231,232, a microphone 222, and the like may be arranged on the first body 201. These devices may be arranged mainly on the front case 201a.

The display module 251 may occupy a major portion of the front case 201a. The audio output unit 252 and the camera 221 may be disposed at a region adjacent to one end of the display module 251, and the microphone 222 may be disposed at a region adjacent to the other end thereof. The user input unit 230 may be arranged on the first and second bodies 201 and 202. The interface 270 may be disposed on lateral surfaces of the front case 201 and the rear case 202.

The user input unit 230 may be manipulated to receive a command for controlling the operation of the portable terminal 200, and may include a plurality of manipulation units 231, 232. The manipulation units 231, 232 may be commonly designated as a manipulating portion, and any method may be employed if it is implemented in a tactile manner allowing the user to perform manipulation with a tactile feeling. For example, the manipulation units 231, 232 may be a button, switch, toggle switch, rocker switch, or anther appropriate type of input device.

The content inputted by the manipulation units 231, 232 may be set in various ways. For example, the first manipulation unit 231 may be used to receive a command, such as start, end, scroll, or the like, and the second manipulation unit 232 may be used to receive a command, such as controlling a volume level being outputted from the audio output unit 252, or switching it into a touch recognition mode of the display module 251. The display module 251 together with a touch sensor 251c (see FIG. 3) may form a touch screen, and the touch screen may function as a manipulation unit.

As shown in the drawings, the first manipulation unit 231 may be implemented by activation of a transparent display module 253 on the second body 202. Here, 'transparent' may include 'semi-transparent (translucent)' as well as 'completely transparent.'

The transparent display module 253 may be transparent, as illustrated in FIG. 2C, without displaying visual information, such as key patterns or the like, prior to being activated. The transparent display module 253 may be converted to display visual information, as shown in FIG. 2A, upon being activated.

Referring to FIG. 2B, a rear pacing camera 221' may additionally be mounted on the rear surface of the terminal body, namely, the rear case 201b. The camera 221' may be positioned to capture images in a direction which is substantially opposite to the direction of the camera 221 (refer to FIG. 2A), and may have different pixel specifications from those of the camera 221.

For example, the camera 221 has a relatively small number of pixels enough not to cause a difficulty when the user captures his or her own face and sends it to the other party during a video call or the like, and the camera 221' may have a relatively large number of pixels since the user often captures a general object that is not sent immediately. The cameras 221, 221' may be provided in the terminal body in a rotatable or pop-out manner.

In addition, a flash 223 and a mirror 224 may be disposed adjacent to the camera 221'. The flash 223 illuminates light toward an object when capturing the object with the camera 221'. The mirror 224 allows the user to look at his or her own face, or the like, in a reflected way when capturing himself or herself (in a self-portrait mode) by using the camera 221'.

An audio output unit 252' may be disposed on a rear surface of the terminal body. The audio output unit 252' together with the audio output unit 252 (refer to FIG. 2A) can implement a stereo function, and it may be also used to implement a speaker phone mode during a phone call.

An antenna for receiving broadcast signals may be additionally disposed on a lateral surface of the terminal body. The antenna 216 constituting a broadcast receiving module 111 (refer to FIG. 1) may be provided so as to be pulled out from the terminal body.

A power supply unit 290 for supplying power to the mobile terminal 200 may be mounted on the first body 201 of the terminal. The power supply unit 290 may be configured so as to be incorporated in the terminal body or directly detachable from the outside of the terminal body.

A touch sensor for detecting a touch input may be additionally mounted on the rear case 201b. The touch sensor may be configured in a transparent type similarly to the display module 251. In this case, if the display module 251 is configured to output visual information from both sides of the display module 251, then the visual information may be also recognized through the touch sensor. The information being outputted from the both sides thereof may be controlled by the touch sensor. Alternatively, a display may be additionally mounted on the touch sensor, and a touch screen may be also disposed on the rear case 201b.

The touch sensor may be operated in association with the display module 251 of the front case 201a. The touch sensor may be disposed in parallel at a rear side of the display module 251. The touch sensor may have a size the same as or less than that of the display module 251.

Referring to the drawings, a user can get a new feeling by using the transparent display module 253 of the second body 202. Hereinafter, the structure of the second body 202 will be described in more detail.

Figure 3:
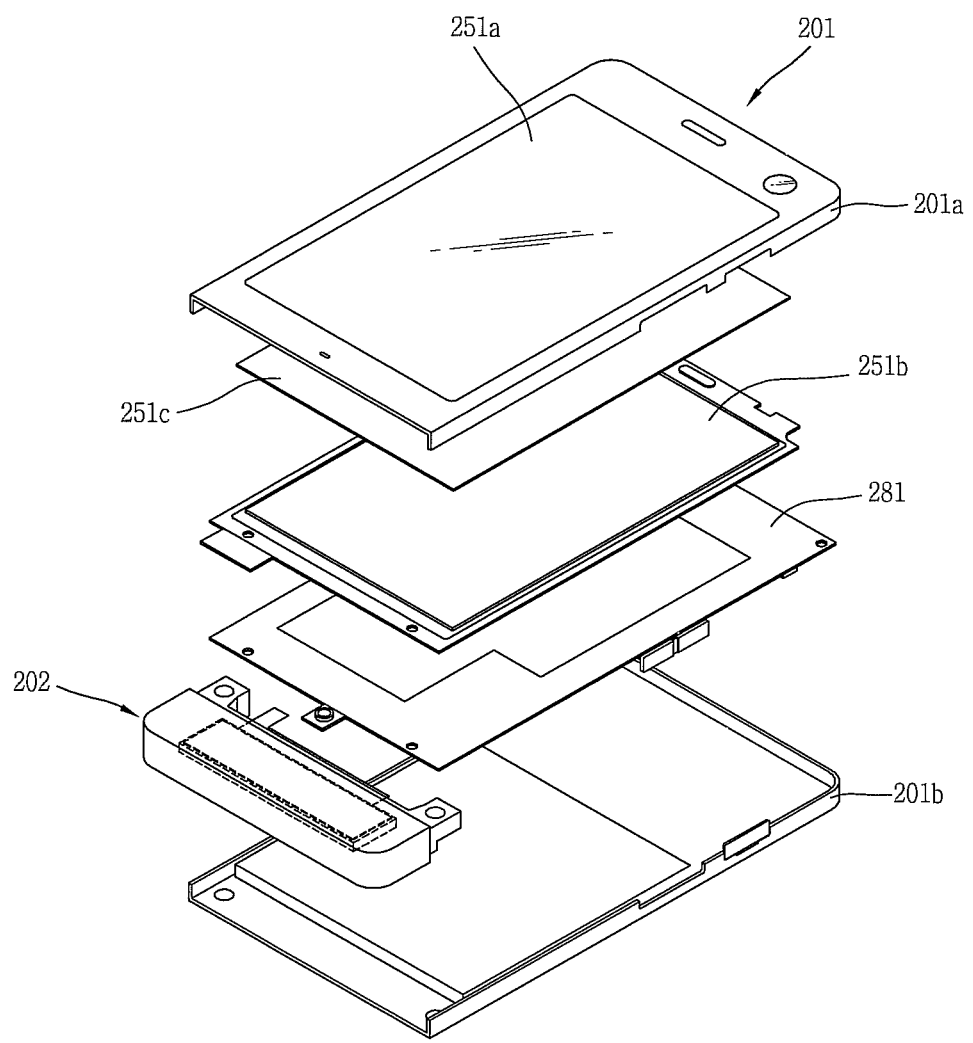
FIG. 3 is an exploded view of the mobile terminal of FIG. 2C.
Figure 4:
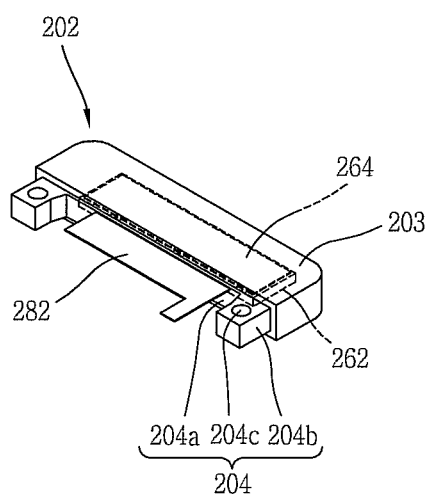
FIG. 4 is an enlarged view of the second body of FIG. 3.
Figure 5:
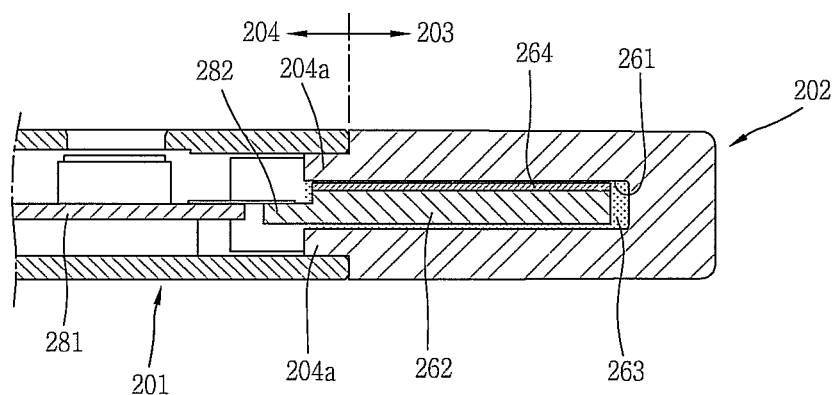
FIG. 5 is a sectional view taken along the line V-V of FIG. 2C.

FIG. 3 is an exploded view of the mobile terminal of FIG. 2C, FIG. 4 is an enlarged view of the second body of FIG. 3, and FIG. 5 is a sectional view taken along the line V-V of FIG. 3.

Referring to FIG. 3, a window 251a may be coupled to a surface of the front case 201a. The window 251a may be made of a transparent material, for example, a transparent synthetic resin, tempered glass, or the like. Here, the window 251a may include an opaque (non-transparent) portion.

A display 251b may be mounted on a rear surface of the window 251a. The display 251b may display visual information, and be disposed to be obscured by the window 251a. The display 251b may be one of a liquid crystal display (LCD), a thin film transistor liquid crystal display (TFT-LCD), an organic light-emitting diode (OLED), flexible display, a three-dimensional (3D) display or another appropriate type of display.

The window 251a may obscure the display 251b. A transparent portion of the window 251a may have an area corresponding to the display 251b. Accordingly, the user can recognize visual information outputted on the display 251b from the outside.

A circuit board 281 may be mounted on the rear case 201b. The circuit board 281 may be configured as one example of the controller 180 (see FIG. 1) for operating various functions of the mobile terminal.

As shown, in FIG. 3 the window 251a may be provided with a touch sensor 251c. The touch sensor 251c may be mounted on the rear surface of the window 251a. The transparent portion of the window 251a may define an inputtable region by the touch sensor 251c. The touch sensor 251c may be transparent, and convert the change of voltage, capacitance or the like generated from a specific portion of the window 251a into an electric input signal so as to allow sensing of a touch input.

Thus, the window 251a, the touch sensor 251c and the display 251b may configure the display module 251 (see FIG. 2A). The display module 251 may operate as a touch screen. In this case, the touch screen may be controlled by the circuit board 281.

Referring to the drawings, the second body 202, which is formed of a transparent material, may be coupled to the first body 201. One end of the first body 291 may be open, and accordingly an inner space of the first body 201 communicates with an inner space of the second body 202.

In more detail, the second body 202, as shown in FIGS. 4 and 5, may include a recess portion 261, a transparent display 262 and a filler 263. The recess portion 261 may be recessed into a surface of the second body 202 in a direction of being farther away from the first body 201. A case of the second body 202 may be implemented by a single case having one open side such that the inner space of the second body 202 can be formed by the recess portion 261. That is, the second body 202 may include a single case having the transparent display 262 disposed therein. The single case may be formed of a transparent material. The recess portion 261 may define the inner space of the single case.

The transparent display 262 may be inserted into the recess portion 261, and electrically connected to the circuit board 281. The transparent display 262 may be formed of a transparent material, and configured to display visual information on a transparent space. For example, when an image is displayed on the transparent display 262, the image may be viewed from the front side of the display as well as the rear side of the display. One example of the transparent display 262 may be a transparent OLED (TOLED).

The filler 263 may be formed of a transparent material and may fully fill in the empty space of the recess portion 261 in which the transparent display 262 is inserted. For example, the filler 263 may be provided to fill gaps formed between the transparent display 262 and the inner wall of the recess 261. The filler 263 may fill a portion of the empty space of the recess portion 261, the portion being exposed outside the first body 201, thereby minimizing (preventing) light reflection near the transparent display 262.

The filler 263 may be configured to adhere the transparent display 262 onto the second body 202 as it fills the empty space. For allowing the adhesion function, the filler 263 may be formed of super view resin (SVR), which is hardened from a liquid state into a solid state.

The filling method for the filler 263 will be exemplarily described hereinafter. First, a liquid SVR is filled in the recess portion 261 of the second body 202 by a predetermined height, and then the transparent display 262 is inserted into the recess portion 261. Afterwards, the SVR is hardened, for example, at room temperature, by radiation of ultraviolet rays, by heat or the like.

The filling may be performed in a vacuum state, thus to prevent bubble from being generated in the filler 263. To maintain the vacuum state, the hardening of the filler 263 may be carried out in a state that the second body 202 is arranged in a vacuum chamber.

As such, as the transparent display 262 may be inserted in the transparent single case and the transparent filler 263 is filled, the transparent display module 253 (see FIGS. 2A and 2C) can be implemented. Also, the filler 263 can be completely filled in the empty space, resulting in improving transmittance at a spaced portion between the case and the display 262 and realizing a transparent body without a boundary.

The foregoing description has illustrated the transparent display, but the present application may not be limited to the structure. For example, if an opaque display, such as LCD, is disposed in place of the transparent display 262, a display module having high visibility, although not transparent, can be implemented by virtue of the filler being filled.

Still referring to FIGS. 4 and 5, the second body 202 may include an exposed part 203 and a housed part 204. The exposed part 203 (exposed region) may refer to a region of the second body 202 which is positioned outside the first body 201 and allowed to display visual information through the transparent display 262. The exposed part 203 may define a part of an appearance of the mobile terminal 200. Various designs may be applied to the exposed part 203 in consideration of decoration.

The filler 263 may be filled in the recess portion 261, including the exposed part 203 and a partial portion over the boundary between the exposed portion 203 and the housed portion 204 (housed region). That is, the filler 263 may fully fill the exposed part 203, and accordingly the exposed part 203 can form an integrally transparent appearance without an empty space.

The housed part 204 may refer to a region of the second body 203 which is positioned within the first body 201 and may extend from the exposed part 203 to be inserted into the first body 201. Upon the housed part 204 being inserted in the first body 201, the principal surfaces of the housed part 204 and the exposed part 203 may be stepped to each other such that the boundary between the housed part 204 and the exposed part 203 can be stopped at a surface of the first body 201. In other words, a surface of the housed region may be stepped (e.g., recessed) relative to a surface of the exposed region such that the surface of the exposed region is positioned adjacent to the first body when the surface of the housed region is inserted in the first body.

In more detail, the housed part 204 may be formed thinner than the exposed part 203, such that the sum of thicknesses of the housed part 204, the front case 201a and the rear case 201b can match with the thickness of the exposed part 203. Consequently, an outer surface of the exposed part 203 can be flush or coplanar with an outer surface of the first body 201.

The housed part 204 may include a base 204a and a coupling portion 204b. The base 204a may extend from one end of the exposed part 203 toward the first body 201, and an opening of the recess portion 261 may be located at the base 204a.

The coupling portion 204b may be a protrusion which is protruded from at least one of the ends of the base 204a to be coupled to the first body 201. Referring to FIG. 4, the coupling portions 204b may be symmetrical to each other in right and left directions (e.g., laterally across the second body 202) based upon the opening of the recess portion 261. The coupling portion 201b may include a coupling hole 204c for coupling with the cases 201a, 201b by a screw.

The coupling portion 204b may exhibit a supporting force as strong as capable of firmly maintaining a fixed state of the second body 202 to the first body 201 when the exposed portion 203 is affected by an external impact or present under a continuous force. The coupling portion 204b may be formed simultaneously when the single case of the second body 202 is molded, resulting in no need of a separate member for formation.

It should be appreciated that other forms of coupling may be provided to couple the second body 202 to the first body 201. For example, the coupling portion 201b may include a hook that connects to a corresponding recess in the first body 201. Alternatively, the coupling portion 201b may be formed to couple to the first body 201 by friction when placed in a corresponding recess in the first body 201. In these embodiments, the second body 202 may be removably attached to the first body 201 such that the second body 202 may be easily replaced. For example, a second body 202 having a different size, shape, color, specification, or the like, may be attached to the first body 201 in a modular manner.

Referring to the drawings, a flexible printed circuit board 282 for defining an electrical connection path may be coupled to the transparent display 262. The flexible printed circuit board 282 may be located at the housed part 204. The flexible printed circuit board 282 may be electrically connected, for example, to the circuit board 281. Hence, the circuit board 281 can control the transparent display 262.

The filler 263 may be filled between the flexible printed circuit board 282 and the recessed portion 261 in the housed portion 204 for securing the flexible printed circuit board 282. That is, the filler 263 may be filled even into the housed portion 204 for securing the flexible printed circuit board 282.

Referring to FIG. 5, the transparent display 262 may include a touch sensor 264 so as to be implemented as a transparent touch screen. For example, the touch sensor 264 for detecting a touch input on the second body 202 may be inserted in the recess portion 261.

The touch sensor 264 may be transparent, and convert a change in voltage, capacitance, or the like, generated from a specific portion of the second body 202 into an electric input signal so as to allow sensing of the touch input.

More especially, the touch sensor 264 may be mounted on the transparent display 262. The filler 263 may be filled between the touch sensor 264 and an inner surface of the recess portion 261. Hence, the touch sensor 264 may be inserted in the recess portion 261 together with the transparent display 262 while being mounted on the transparent display 262.

Consequently, as the touch sensor 264 is inserted in the recess portion 261, various user interfaces can be implemented. Hereinafter, user interfaces applied to the terminal of FIG. 3 will be exemplarily described with reference to FIGS. 6A to 8B.

Figure 6:
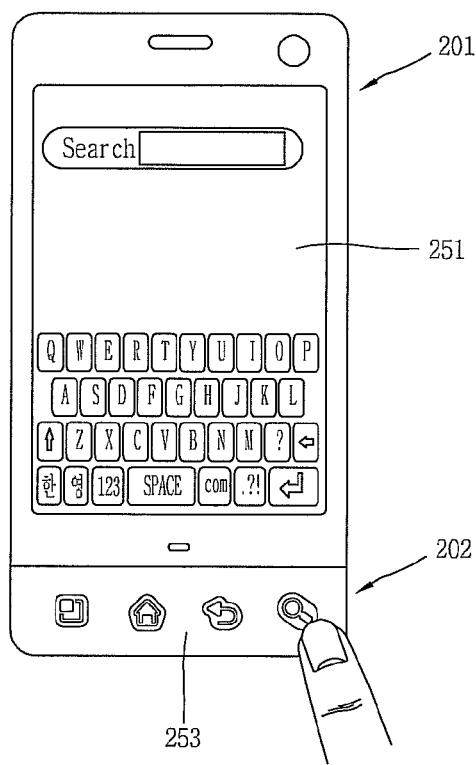
FIGS. 6 to 8B are conceptual views respectively illustrating user interfaces applied to the mobile terminal of FIG. 3.
Figure 8A:
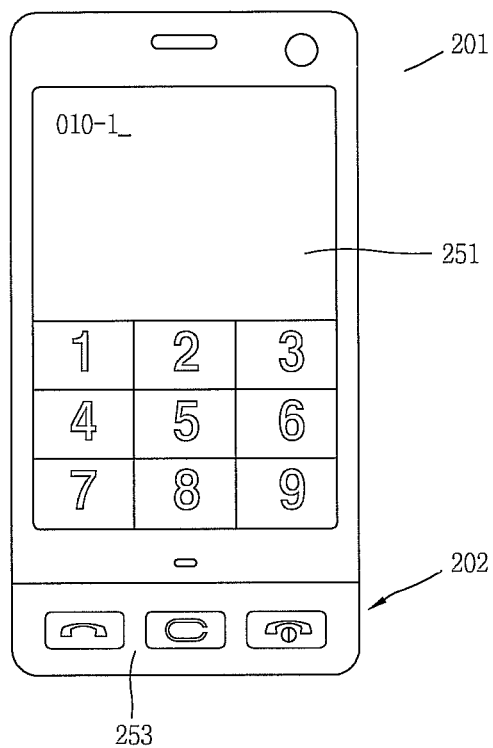
Figure 8B:
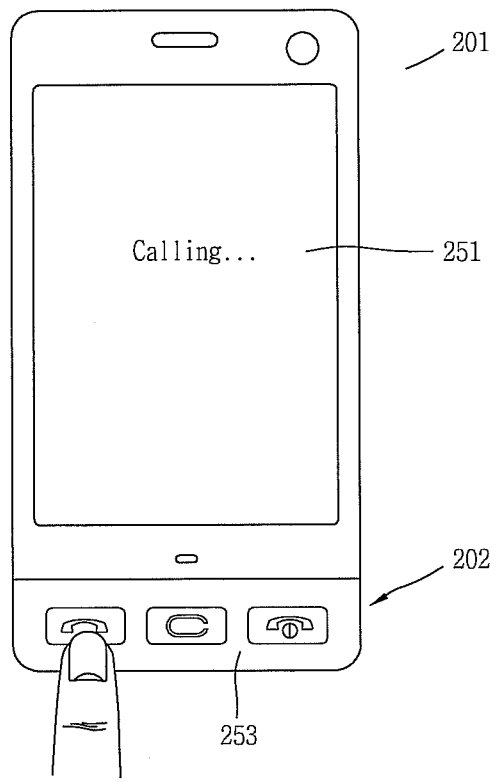

FIGS. 6 and 8B are conceptual views respectively illustrating user interfaces applied to the mobile terminal of FIG. 3.

Figure 7:
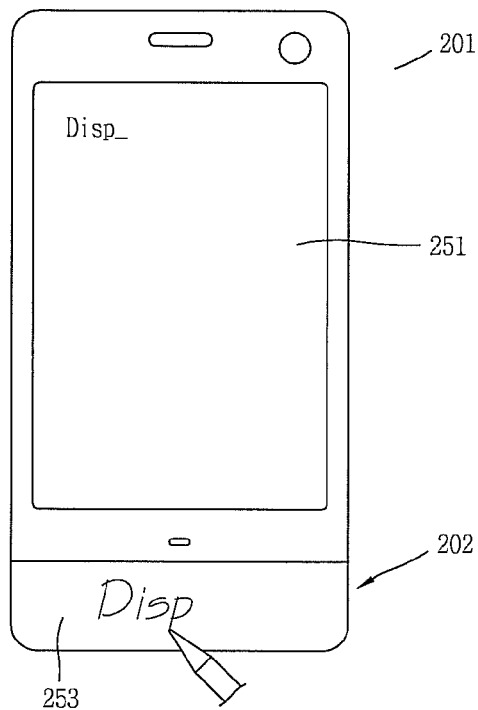

Referring to FIGS. 6 and 7, the touch sensor 264 (see FIG. 5) of the second body 202 may be configured to sense a control command with respect to the display module 251 of the first body 201. For example, the second body 202 may display menu keys for entering each mode of the mobile terminal, and the corresponding mode may be executed on the display module 251 in response to the touch of the menu key. FIG. 6 exemplarily illustrates a search mode being executed responsive to the touch of a search key.

As another example, referring to FIG. 7, an input window for letter (character) input may be displayed on the second body 202, and the letters input via the input window through a touch input may be displayed on the display module 251. For example, the touch input may be input using a stylus or a user finger, or the like.

Referring to FIGS. 8A and 8B, the transparent display may be controlled by a touch input inputted on the touch screen of the first body 201. For example, the display module 251 of the first body 201 may be implemented as a touch screen, and may display input keys for inputting a phone number. Also, the transparent display module 253 of the second body 202 may display a call connection key and a call termination key. When a user touches the call connection key, information indicating a call connection may be displayed on the display module 251. The transparent display module 253 can thus implement various user interfaces in combination with the display module 251 of the first body 201.

Hereinafter, other exemplary embodiments related to the transparent display module will be described.

Figure 9A:
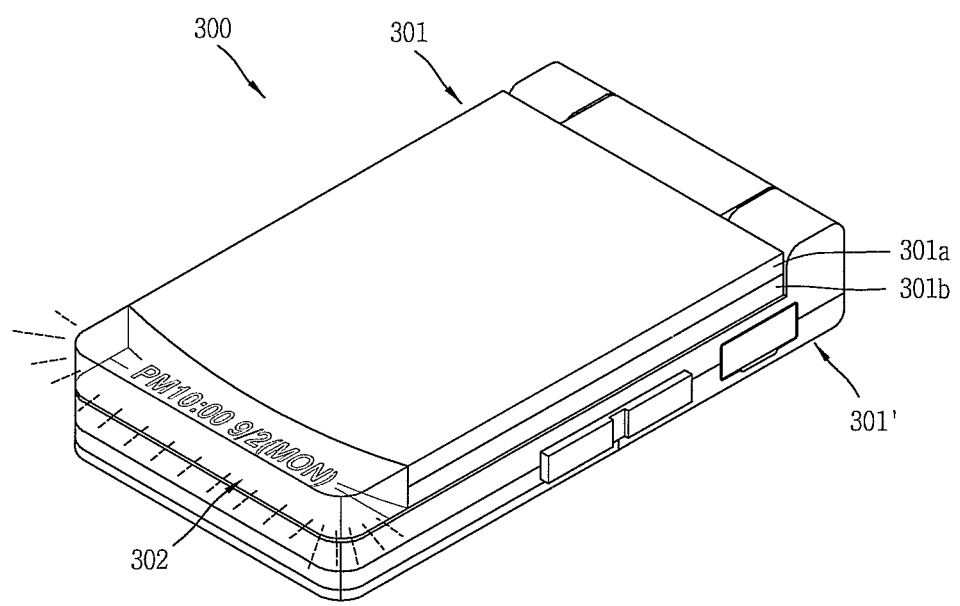
FIGS. 9A and 9B are perspective views illustrating a closed state and an open state, respectively, of the transparent display module applied to a folder type terminal according to one embodiment.
Figure 9B:
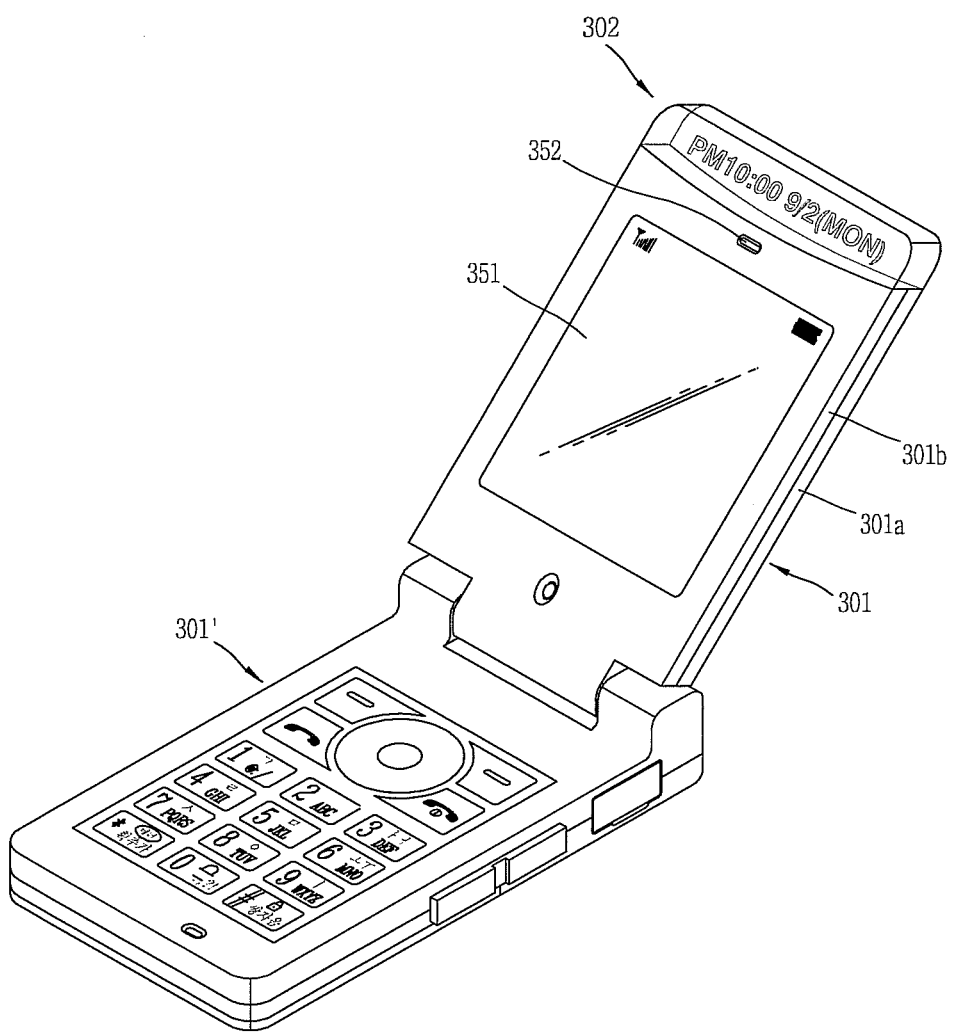
Figure 10:
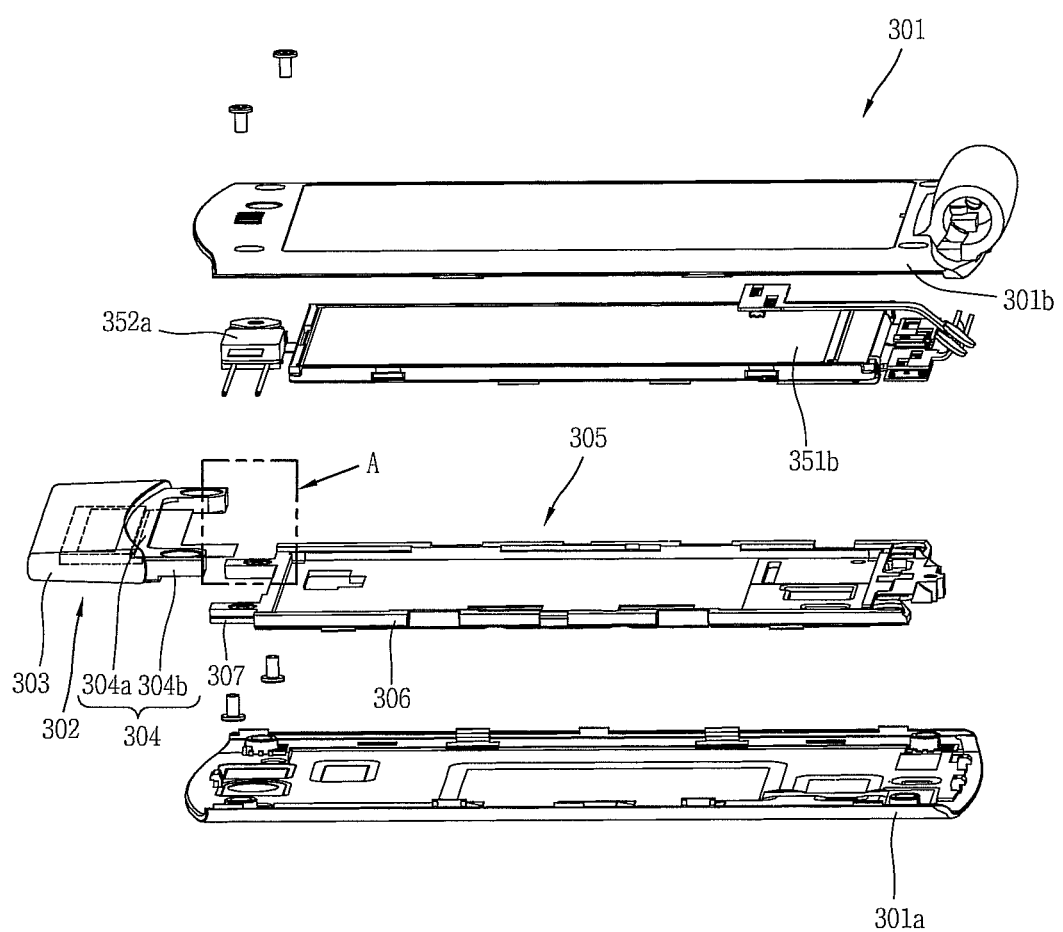
FIG. 10 is an exploded view of a first folder body of FIG. 9A according to one embodiment.
Figure 11:
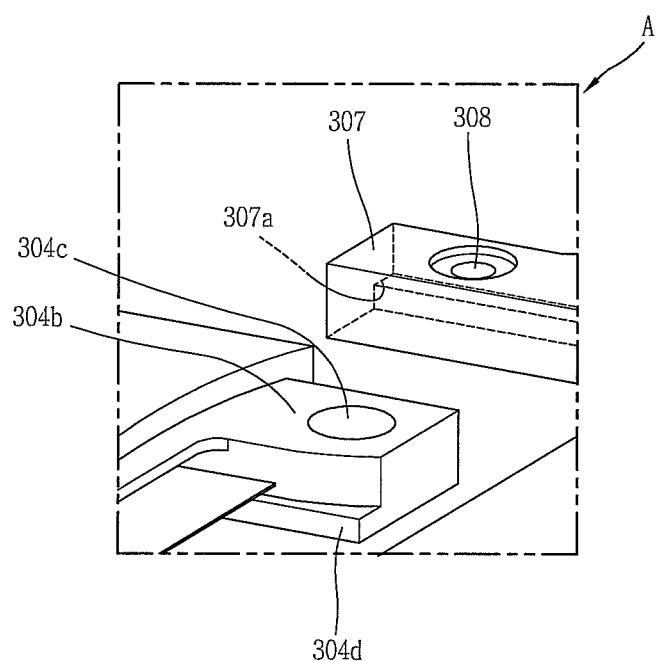
FIG. 11 is an enlarged view of part A of FIG. 10.

FIGS. 9A and 9B are perspective views illustrating a closed state and an open state, respectively, in case where the transparent display module is applied to a folder type terminal (flip type), FIG. 10 is an exploded view of a first folder body 301 of FIG. 9A, and FIG. 11 is an enlarged view of part A of FIG. 10.

Referring to the drawings, a mobile terminal 300 may include a first folder body 301 and a second folder body 301' slidably coupled to each other. Here, the structures associated with the present disclosure are not limited to those types of mobile terminals illustrated in the drawings, but may be applicable to any type, such as a slide type, a swing type, a swivel type, a combination type having both a swivel and flip axis, or the like, which has two or more bodies having a relatively movable structure.

A state in which a front surface of the second folder body 301' is externally exposed, as shown in FIG. 9B, may be referred to as an open configuration, and a state that the exposed front surface of the second folder body 301' is then obscured by the first folder body 301, as shown in FIG. 9A, may be referred to as a closed configuration.

In this exemplary embodiment, the first folder body 301 corresponds to the first body of the exemplary embodiment illustrated in FIG. 3. Also, the like/similar components to the embodiment of FIG. 3 will be understood by the initial description.

Referring to FIG. 9A, a second body 302 may be installed at an outer surface of the first folder body 301. The second body 302 may be configured to output various status information or user contents of the mobile terminal 300 without opening the first folder body 301. That is, visual information displayed on the second body 302 may face the outer surface of the second body 302.

In addition, the second body 302 may be configured to display information related to various modes of the mobile terminal 300 and to realize various lighting effects. For example, when the mobile terminal 300 receives an incoming call or a text message, corresponding visual information may be provided on the second body 302. Besides, the second body 302 may be used as a clock in the closed state of the mobile terminal 300.

Referring to FIG. 9B, an audio output unit 352 and a display module 251 may be installed on an inner surface of the first folder body 301. Information displayed on the second body 302 may be converted to face the inner surface of the second body 302.

The display module 351 may output user interfaces, information being edited, user contents and the like in various modes of the mobile terminal 300. A screen outputted via the display module 351 may be convertible depending on an orientation of the mobile terminal 300. For example, a screen outputted on the display module 351 may be rotated or adjusted in size, and a screen outputted on the second body 302 may depend on the change of the display module 351.

Referring to FIG. 10, a coupling portion 304b of a housed portion 304 of the second body 302 may be provided in plurality to be protruded from both ends of a base 304a, and a speaker 352a may be located between the plurality of coupling portions 304b. Consequently, as the speaker 352a is positioned at a recessed area of the housed portion 304, a compact configuration can be obtained. The display module 351 (see FIG. 9B) may be located on the first folder body 301, and a display 351b controlled by a circuit board (not shown) may be mounted on the first folder body 301.

Referring to FIG. 10, a frame 305 for supporting the display 351b may be mounted between cases 301a and 301b of the first folder body 301, and the coupling portions 304b may be secured by the frame 305. The frame 305 may include a supporting portion 306 and protruded portions 307 (protrusions).

The supporting portion 306 may be formed along an edge of the display 351b to support the display 351b. More particularly, the supporting portion 306 may form a closed loop and support the edge of the display 351b. The protruded portions 307 may be protruded from the supporting portion 305. The protruded portions 307 may include through holes 308, respectively, through which the cases 301a and 301b of the first folder body 301 can be coupled to each other by screws.

Referring to FIGS. 10 and 11, the coupling portion 304b may be coupled to the cases 301a and 301b of the first folder body 301, and a part of the frame 305 may obscure or formed to overlap the coupling portions 304b. For example, the coupling portion 304b of the second body 302 may be placed under the protruded portion 307 to be obscured by the protruded portion 307 in a direction of penetrating the display 351b (e.g., along the longitudinal direction as shown in FIG. 11). In order for the coupling portion 304b to be obscured by the protruded portion 307, an accommodation groove 307a may be formed at a side surface of the protruded portion 307, and an accommodation protrusion 304d may be disposed at the coupling portion 304b. The accommodation protrusion 304d is accommodated in the accommodation groove 307a, so as to be obscured by the protruded portion 307.

With this structure, when the frame 305 is coupled to the rear case 301a in a state of the second body 302 being arranged on the rear case 301a, the second body 302 may be secured. For firmer coupling, the coupling portion 304b may be coupled to the rear case 301a through the coupling hole 304c by a screw. Thus, since the second body 302 is secured by the frame 305, the appearance of the second body 302 may have an appearance in which reinforcing structure are not visible. Moreover, as previously described, the second body 302 may be removably coupled to the first folder body 301.

Figure 12:
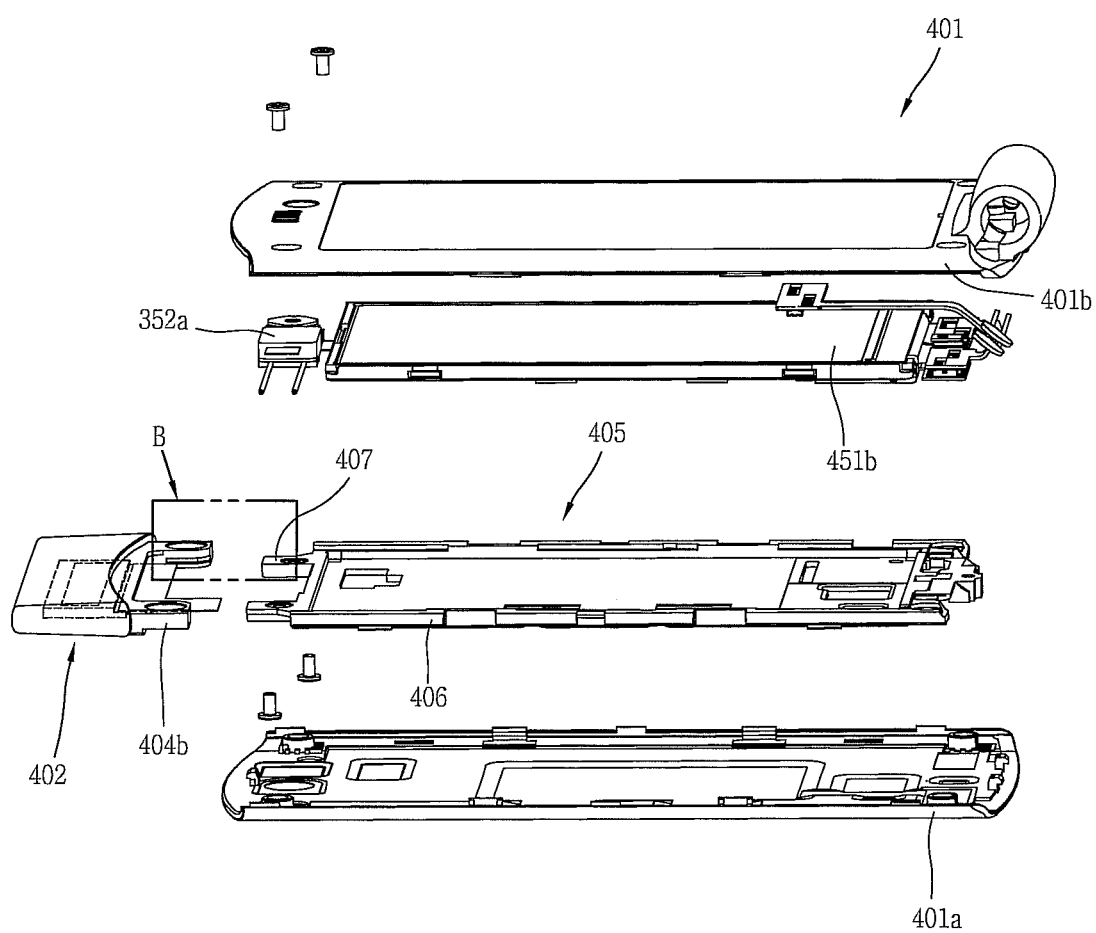
FIG. 12 is an exploded view illustrating a first folder body of FIG. 9A according to another embodiment.
Figure 13:
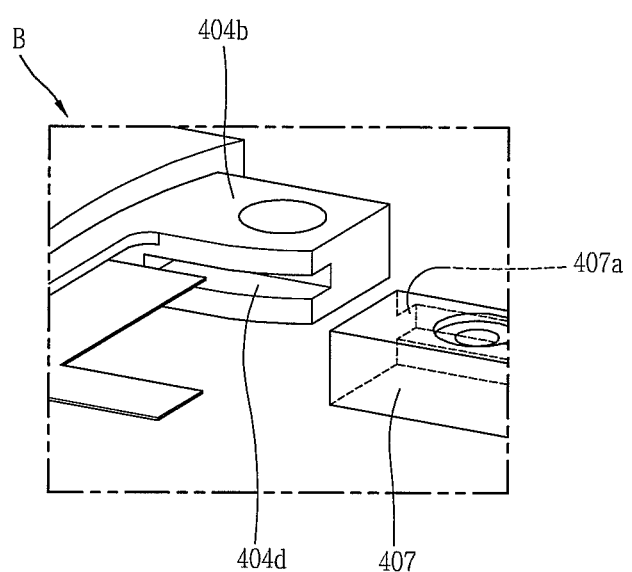
FIG. 13 is an enlarged view of part B of FIG. 12.

FIG. 12 is an exploded view illustrating a variation of a first folder body 401 and FIG. 13 is an enlarged view of part B of FIG. 11.

Referring to FIGS. 12 and 13, a protruded portion 407 of a frame 405 may partially be slid into a coupling portion 404b of a second body 402. To this end, the coupling portion 404b may include an insertion guide 404d, and the protruded portion 407 may include an insertion wing 407a which may be slid into the insertion guide 404d.

With the structure, the second body 402 may be mounted to a rear case 401a of the first folder body 401 by being slid into the frame 405.

As described above, as a transparent display is inserted in a transparent case, and a transparent filler is used to fill and/or attach the transparent display to the transparent case, the transparent display module that displays visual information on a transparent body can be implemented. Accordingly, visual information can be displayed on both front and rear surfaces of the body.

The use of the filler can improve transmittance in a gap between the case and the display, and allow implementation of an integrally transparent body, resulting in enhancing reliability with respect to introduction of dust and external impact. The exposed portion of the transparent body can be implemented by a single case and a transparent display, thereby realizing a slim structure of the terminal and simplifying of an assembly process, or the like, which may result in obtaining the transparent body having neat and attractive appearance without a reinforcing structure.

As broadly described and embodied herein, a mobile terminal may include a transparent case, which may be transparent in an OFF state and may display visual information in an ON state. The mobile terminal may have a transparent display module with superior optical properties.

The mobile terminal may include a first body, and a second body made of a transparent material and mounted to the first body to form a partial appearance of the terminal, wherein the second body includes a recess portion recessed at a surface of the second body in a direction of being farther away from the first body, a transparent display inserted in the recess portion, made of a transparent material, and configured to display visual information thereon, and a filler filled in an empty space of the recess portion accommodating the transparent display therein, the filler made of a transparent material.

In one aspect of the detailed description, the filler may adhere the transparent display onto the second body with being filled in the empty space. The filler may be filled in a portion of the empty space, the portion being exposed outside the first body, to minimize light reflection near the transparent display. The filler may be formed of super view resin (SVR) hardened from a liquid state into a solid state.

In another aspect of this detailed description, a touch sensor may be inserted in the recess portion to detect a touch input with respect to the second body. The touch sensor may be mounted on the transparent display, and the filler may be filled between the touch sensor and an inner surface of the recess portion. A touch screen may be configured on the first body, and the touch sensor may be configured to detect a control command for the touch screen. The transparent display may be controlled by a touch input on the touch screen.

In another aspect of the detailed description, the second body may include an exposed part disposed outside the first body, the exposed part displaying visual information via the transparent display, and a housed part extending from the exposed part to be inserted in the first body. A flexible printed circuit board may be coupled to the transparent display, and electrically connected to a circuit board for controlling the transparent display. The flexible printed circuit board may be located at the housed part. The filler may be filled between the flexible printed circuit board and the recess portion in the housed part, to secure the flexible printed circuit board.

In another aspect of the detailed description, principal surfaces of the housed part and the exposed part may be stepped to each other such that a boundary between the housed part and the exposed part can be stopped at a surface of the first body when the housed part is inserted in the first body. The filler may be filled in the recess portion, including the exposed part and a partial portion over the boundary.

In another aspect of the detailed description, the housed part may include a base extending from one end of the exposed art toward the first body, an opening of the recess portion being arranged at the base, and a coupling portion protruded from at least one of both ends of the base and coupled to the first body. A display for displaying visual information and a frame for supporting the display may be mounted on the first body, and the coupling portion may be secured by the frame.

In another aspect of the detailed description, the frame may include a supporting portion formed along an edge of the display and configured to support the display, and a protruded portion protruded from the supporting portion and having a through hole for allowing coupling to the first body. The coupling portion may be obscured by the protruded portion in a direction of penetrating the display, and the coupling portion may include a coupling hole for allowing coupling to the first body.

In another aspect of the detailed description, the coupling portion may include an insertion guide configured such that at least part of the protruded portion is slid into the coupling portion. The coupling portion may be coupled to a case of the first body, and at least part of the frame may obscure the coupling portion. In another aspect of the detailed description, the second body may include a single case having the transparent display mounted therein, and the recess portion may define an inner space of the single case.

As broadly disclosed and embodied herein, a mobile terminal may include a first body; and a second body formed of a transparent material and attached to the first body, wherein the second body may include a recess formed on a surface of the second body and recessed away from the first body, a transparent display provided in the recess and formed of a transparent material, and configured to display visual information thereon, and a filler material provided in the recess at a gap between the transparent display and the recess, the filler material formed of a transparent material.

In this embodiment, the filler material may adhere the transparent display to the second body while filling one or more gaps between the transparent display and the recess. The filler material may be provided to fill at least one gap which is exposed outside the first body such that light reflection near the transparent display is minimized. Moreover, the filler material may be formed of a super view resin (SVR) that is hardened from a liquid state into a solid state.

A touch sensor may be provided in the recess that detects a touch input at the second body. The touch sensor may be provided over the transparent display, and the filler material may be provided between the touch sensor and an inner surface of the recess. A touch screen may be provided on the first body, and the touch sensor on the transparent display may be configured to detect a control command that controls the touch screen on the first body. The transparent display may be controlled by a touch input on the touch screen.

In this embodiment, the second body may include an exposed region which is disposed adjacent to the first body, the exposed region displaying visual information via the transparent display, and a housed region that extends from the exposed region and inserted in the first body. A flexible printed circuit board may be coupled to the transparent display, the flexible printed circuit board being electrically connected to a circuit board provided in the first body which is configured to control the transparent display. The flexible printed circuit board may be positioned at the housed region of the second body. Moreover, the filler material may be provided between the flexible printed circuit board and the recess in the housed region to secure the flexible printed circuit board to the second body.

In certain embodiments, a surface of the housed region may be stepped relative to a surface of the exposed region such that the surface of the exposed region may be positioned adjacent to the first body when the surface of the housed region is inserted in the first body. The filler material may also be provided in the recess that corresponds to the exposed region and at least a portion of the housed region.

The housed region may include a base that extends from the exposed region towards the first body, wherein an opening of the recess is formed at the base; and at least one protrusion that protrudes from the base towards the first body and coupled to the first body. The first body may include a frame for supporting a display provided in the first body, and the at least one protrusion may be secured by the frame to the first body. The frame may include a support surface formed to correspond to an edge of the display and configured to support the display; and at least one protrusion that protrudes from the support surface and having a through hole for coupling the frame to the first body.

At least a portion of the at least one protrusion of the second body may be positioned under the protrusion of the frame, and the at least one protrusion of the second body may include a coupling hole for coupling the second body to the first body. The at least one protrusion of the second body may include an insertion guide formed to correspond to a shape of the protruding portion such that a portion of the protrusion of the first body is slid into the insertion guide. The at least one protrusion of the second body may be coupled to a case of the first body, and at least a portion of the frame of the first body may be positioned to overlap the at least one protrusion of the second body. The second body further may include a case having the transparent display mounted therein, and the recess may define an inner space of the case. Moreover, in the disclosed embodiments, the mobile terminal may be at least one of a bar type mobile terminal, a flip type mobile terminal, or a swivel type mobile terminal.

In one embodiment as broadly disclosed herein, a mobile terminal may include a first casing having a first display, and a second casing having a second display and attached to the first casing to form a body of the mobile terminal, wherein the second casing and the second display are formed to be transparent such that an image displayed on the second display is visible from a front side of the body and a rear side of the body.

In this embodiment, a width of the first casing may be the same as a width of the second casing, a length of the first casing may be greater than a length of the second casing, a thickness of the first casing may be the same as a thickness of the second casing, and a display side surface of the second casing may be coplanar to a display side surface of the first casing. Moreover, the second casing may include a recess formed at a side surface that faces the first casing, the second display being positioned in the recess, and a transparent material provided in the recess to fill gaps formed between the second display and the inner wall of the recess and to secure the second display in the recess. The first and second casings may include at least one connector to attach the second casing to the first casing.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a first body; and
a second body formed of a transparent material and attached to the first body,
wherein the second body includes
a recess formed on a surface of the second body and recessed away from the first body,
a transparent display provided in the recess and formed of a transparent material, and configured to display visual information thereon,
a filler material provided in the recess at a gap between the transparent display and the recess, the filler material formed of a transparent material,
an exposed region which is disposed adjacent to the first body, the exposed region displaying visual information via the transparent display, and
a housed region that extends from the exposed region and inserted in the first body, and
wherein the housed region includes
a base that extends from the exposed region towards the first body, wherein an opening of the recess is formed at the base, and
at least one protrusion that protrudes from the base towards the first body and coupled to the first body.

2. The mobile terminal of claim 1, wherein the filler material adheres the transparent display to the second body while filling one or more gaps between the transparent display and the recess.

3. The mobile terminal of claim 2, wherein the filler material is provided to fill at least one gap which is exposed outside the first body such that light reflection near the transparent display is minimized.

4. The mobile terminal of claim 3, wherein the filler material is formed of a super view resin (SVR) that is hardened from a liquid state into a solid state.

5. The mobile terminal of claim 1, wherein a touch sensor is provided in the recess that detects a touch input at the second body.

6. The mobile terminal of claim 5, wherein the touch sensor is provided over the transparent display, and the filler material is provided between the touch sensor and an inner surface of the recess.

7. The mobile terminal of claim 6, wherein a touch screen is provided on the first body, and the touch sensor on the transparent display is configured to detect a control command that controls the touch screen on the first body.

8. The mobile terminal of claim 7, wherein the transparent display is controlled by a touch input on the touch screen.

9. The mobile terminal of claim 1, wherein a flexible printed circuit board is coupled to the transparent display, the flexible printed circuit board being electrically connected to a circuit board provided in the first body which is configured to control the transparent display, and
wherein the flexible printed circuit board is positioned at the housed region of the second body.

10. The mobile terminal of claim 9, wherein the filler material is provided between the flexible printed circuit board and the recess in the housed region to secure the flexible printed circuit board to the second body.

11. The mobile terminal of claim 1, wherein a surface of the housed region is stepped relative to a surface of the exposed region such that the surface of the exposed region is positioned adjacent to the first body when the surface of the housed region is inserted in the first body.

12. The mobile terminal of claim 11, wherein the filler material is provided in the recess that corresponds to the exposed region and at least a portion of the housed region.

13. The mobile terminal of claim 1, wherein the first body includes a frame for supporting a display provided in the first body, and wherein the at least one protrusion is secured by the frame to the first body.

14. The mobile terminal of claim 13, wherein the frame includes
a support surface formed to correspond to an edge of the display and configured to support the display; and
at least one protrusion that protrudes from the support surface and having a through hole for coupling the frame to the first body.

15. The mobile terminal of claim 14, wherein at least a portion of the at least one protrusion of the second body is positioned under the protrusion of the frame, and wherein the at least one protrusion of the second body includes a coupling hole for coupling the second body to the first body.

16. The mobile terminal of claim 14, wherein the at least one protrusion of the second body includes an insertion guide formed to correspond to a shape of the protruding portion such that a portion of the protrusion of the first body is slid into the insertion guide.

17. The mobile terminal of claim 13, wherein the at least one protrusion of the second body is coupled to a case of the first body, and
wherein at least a portion of the frame of the first body is positioned to overlap the at least one protrusion of the second body.

18. The mobile terminal of claim 1, wherein the second body further includes a case having the transparent display mounted therein, and the recess defines an inner space of the case.

19. The mobile terminal of claim 1, wherein the terminal is at least one of a bar type mobile terminal, a flip type mobile terminal, or a swivel type mobile terminal.

\* \* \* \* \*